United States Patent
Goldstein et al.

(10) Patent No.: US 7,594,939 B2
(45) Date of Patent: Sep. 29, 2009

(54) SYSTEM FOR HYDROGEN STORAGE AND GENERATION

(75) Inventors: Jonathan Goldstein, Jerusalem (IL); Menachem Givon, Kibbutz Shoval (IL)

(73) Assignee: Hyogen, Ltd., Jerusalem (IL)

( * ) Notice: Subject to any disclaimer, the term of this patent is extended or adjusted under 35 U.S.C. 154(b) by 374 days.

(21) Appl. No.: 11/210,086

(22) Filed: Aug. 23, 2005

(65) Prior Publication Data
US 2006/0042162 A1     Mar. 2, 2006

(30) Foreign Application Priority Data
Sep. 1, 2004    (IL)    ................. 163862

(51) Int. Cl.
B01J 7/00     (2006.01)
B01J 19/00    (2006.01)
A62D 3/00     (2007.01)
B01J 19/18    (2006.01)
C01B 3/08     (2006.01)
C01B 3/00     (2006.01)

(52) U.S. Cl. .............. 48/61; 422/198; 422/199; 422/225; 423/657; 423/658.2

(58) Field of Classification Search ........... 48/61; 422/198, 199, 225; 423/657, 658.2
See application file for complete search history.

(56) References Cited

U.S. PATENT DOCUMENTS

| | | | |
|---|---|---|---|
| 3,133,837 A | 5/1964 | Eidensohn | |
| 5,372,617 A | 12/1994 | Kerrebrock et al. | |
| 5,516,599 A | 5/1996 | Korall | |
| 5,728,464 A | 3/1998 | Checketts | |
| 5,817,157 A | 10/1998 | Checketts | |
| 6,534,033 B1 | 3/2003 | Amendola et al. | |
| 2002/0166286 A1 | 11/2002 | McClaine et al. | |
| 2003/0037487 A1 | 2/2003 | Amendola et al. | |
| 2003/0091879 A1 | 5/2003 | Rusta-Sellehy et al. | |
| 2004/0009379 A1* | 1/2004 | Amendola et al. | ........... 429/17 |
| 2004/0011662 A1* | 1/2004 | Xu et al. | ........... 205/408 |
| 2004/0047801 A1 | 3/2004 | Petillo et al. | |
| 2004/0052723 A1 | 3/2004 | Jorgensen | |
| 2004/0166057 A1* | 8/2004 | Schell et al. | ........... 423/658.2 |
| 2004/0184987 A1 | 9/2004 | Ring et al. | |
| 2004/0214056 A1 | 10/2004 | Gore | |

FOREIGN PATENT DOCUMENTS

WO    WO 2004/065292    8/2004

OTHER PUBLICATIONS

International Search Report for PCT/IL2006/000259, Oct. 30, 2006.
* cited by examiner

*Primary Examiner*—Walter D Griffin
*Assistant Examiner*—Lessanework T Seifu
(74) *Attorney, Agent, or Firm*—Andrus, Sceales, Starke & Sawall, LLP

(57) ABSTRACT

The invention provides a solid phase hydrogen-generating system utilizing a solid chemical hydride fuel selected from the group consisting of sodium borohydride, lithium borohydride, magnesium hydride and calcium hydride, wherein the fuel is encapsulated in a plurality of removable capsules, the capsules being pumpable and having a major axis of up to 40 mm.

17 Claims, 6 Drawing Sheets

SYSTEM FOR HYDROGEN STORAGE AND GENERATION

CROSS-REFERENCE TO RELATED APPLICATION

This application claims priority to Israel Application No. 163,862, filed Sep. 1, 2004.

The present invention relates to a system for hydrogen storage, transport and generation. More particularly, the present invention relates to a solid phase hydrogen-generating system comprising a chemical hydride fuel.

There have been many attempts in recent years to use hydrogen as a fuel in vehicles in place of gasoline and diesel. The main advantage of hydrogen is its high energy content per unit weight, and the fact that the sole product from the combustion of hydrogen is water, with none of the usual environmentally unfriendly pollution products from conventional fuels, such as carbon dioxide, CO, NOx, SOx and VOCs etc. Hydrogen may be combusted at reasonable efficiencies in a modified internal combustion engine (with the energy available as mechanical output) and at even higher efficiencies in hydrogen-air fuel cells (energy available as electrical output).

In practical terms, hydrogen in its usual form is a flammable gas, in some cases even an explosive gas, and the need to safely contain it in a lightweight and compact manner particularly for vehicle applications has posed a difficult problem The US DOE goal (2005) for hydrogen storage is that hydrogen be at least 4.5 wt % of the storage system or 6.5 wt % of the fuel. The classical approach has been to store the hydrogen as compressed gas in a cylinder. Unfortunately, in order to achieve a compressed gas storage system of reasonable weight and volume for vehicle applications (i.e. allowing a reasonable travel range between refuelings), the compression pressure must be very high indeed (5000-10000 psi or greater) and costly cylinders or tanks of special composite materials must be used. The crashworthiness and explosion proof character of such high pressure tanks filled with hydrogen remains questionable, and considerable energy will be wasted in compressing hydrogen each time to such high pressures in order to refill the tanks. Work on storing hydrogen cryogenically in liquid form has also proceeded, but fuel at −253 degrees C. needs special precautions, costly insulated tanks must be used to store the fuel, loss of gas in the best designs is still high at a few percent per day (via boil off), and the energy wasted in liquefying the hydrogen (about one third its energy content) is even higher than the energy needed to compress it. Of course both storage of hydrogen in compressed gas form or liquid form suffer from the hazard aspect that all the fuel onboard is available for explosion in the case of an accident or malfunction.

A different approach has been to use hydrogen stored on an inert carrier, for example hydrogen absorbed on a substrate. In principle there is an added safety element in that the stored hydrogen is not freely available, but is only released when required by a pressure and/or temperature desorption swing. Work on absorption-based metal hydride storers, such as transition metal alloys, has not provided high storage capabilities, however. In many cases the metal alloy hydride cost is excessive, the storage level is inferior to compressed gas, parasitic energies to enable gas release are high, and gas release rates slow. Recent work with novel absorption storers such as those based on organic hydrides, glass spheres and carbon nanotubes has also not yet yielded practical storage systems.

Hydrogen also may be generated onboard via catalytic reforming of organic fuels (conventional or other). This approach benefits from the available distribution scenario of fuels. However the reformer usually requires the presence of a precious metal component in the catalyst which is expensive and sensitive to poisoning. Often the catalyst has to work at an elevated temperature which may be in excess of 300 degrees C. This can causes a delay time in startup from cold. Pollution products still may form at the vehicle level and will have to be dealt with, which raises cost, complexity and reliability of the system.

An interesting alternative is the use of chemical hydrides as the hydrogen carrier. These materials release hydrogen on demand by chemical reaction with water (hydrolysis). For simple solid phase hydrides (e.g. sodium hydride, NaH, lithium hydride, LiH, or calcium hydride $CaH_2$) the reaction with water is spontaneous and irreversible. Note also that part of the hydrogen released is supplied from the water reactant.

$$NaH + H_2O = NaOH + H_2 \tag{1}$$

$$LiH + H_2O = LiOH + H_2 \tag{2}$$

$$CaH_2 + 2H_2O = Ca(OH)_2 + 2H_2 \tag{3}$$

Considering for example only the sodium hydride "fuel" alone, the hydrogen content in the sodium hydride molecule is 4.3 wt %. The equivalent hydrogen content figure for lithium hydride is 12.5 wt %, while the figure for calcium hydride is 4.7 wt %.

In principle the water for the reaction need not be included in the fuel weight provided that all (100%) of the water from the fuel cell reaction, $$H_2 + 0.5 O_2 = H_2O \tag{4}$$

can be reclaimed and used in the hydrolysis reaction. Most efficient fuel use requires that all (100%) of fuel reacts with water. If such high levels of water reclamation and fuel utilization are realized then the effective hydrogen storage level from the fuel is 8.6 wt % for sodium hydride, 25 wt % for lithium hydride and 9.4 wt % for calcium hydride. For vehicle systems using this concept, the hydrolysis product (sodium hydroxide, lithium hydroxide or calcium hydroxide respectively) must be retained on board, collected and recycled back to the respective hydride (e.g. at a regeneneration plant) by suitable thermal means (e.g. using methane, metallothermic or carbothermic reduction) or electrochemical means. Calcium hydride gives a difficult to handle solid phase reaction product (calcium hydroxide) limiting its utilization factor and hitherto precluding use for vehicle systems.

Application of these simple hydrides for hydrogen powered vehicles has been disclosed by Checketts for sodium hydride (U.S. Pat. No. 5,817,157) and by McClaine for lithium hydride (U.S. Applied 20020166286). The high caustic nature of these hydrides, the fact that they are in a difficult-to-transfer solid phase, and their violent reaction with water was dealt with by Checketts using plastic or metal coated hydride pellets that are introduced one by one into a water tank and sliced using a knife or if metal coated electrolytically dissolved. Note that the sheathed hydride pellets must be manufactured each cycle and that the reaction product of the hydrolysis is a highly caustic, hazardous, concentrated (>30 wt %) sodium hydroxide solution. McClaine disclosed a lithium hydride dispersion in a mineral oil which is pumpable and reacts less explosively with water than solid lithium hydride. Here unfortunately the suspension is still quite flammable and moisture sensitive, the suspension must be manufactured each time, and as with sodium hydride the reaction product of the hydrolysis reaction is a highly caustic hazardous lithium hydroxide solution/slurry.

Use of complex chemical hydrides such as sodium borohydride NaBH₄ for hydrogen storage and generation has been disclosed by Amendola (U.S. Pat. No. 6,534,033, 20030037037487) and by Rusta-Sellehy (U.S. 20030091879). Sodium borohydride is a solid phase material with appreciable solubility in water (35 wt % at room temperature), giving a non-flammable, reduced causticity and convenient pumpable solution which, in the presence of stabilizers such as 1-5 wt % sodium hydroxide, is quite stable towards autodecomposition at usual ambients. When such a solution is brought into contact with certain catalyst materials (such as ruthenium based or cobalt based catalysts) a clean, complete hydrolysis reaction occurs to give hydrogen and the hydrolysis product sodium metaborate, NaBO₂. The hydrolysis reaction is:

$$NaBH_4 + 2H_2O = NaBO_2 + 4H_2 \quad (5).$$

Thus hydrogen is produced as and when required and there is no storage of bulk hydrogen on board compressed to high pressures. If the hydrogen produced is fed to a fuel cell, only half the product water need be reclaimed and returned for the hydrolysis reaction to maintain the water quantity in reaction 5. Use of product water from the fuel cell to sustain hydride hydrolysis was disclosed in Eidensohn, U.S. Pat. No. 3,133,837. From reaction 5, the hydrogen content of solid phase sodium borohydride is actually 10.5 wt %. However, since four moles of hydrogen are effectively produced from one mole of sodium borohydride, then a fuel quantity of say 100 kg of a 35 wt % solution of sodium borohydride (i.e. containing 35 kg solid sodium borohydride) will provide about 7.4 kg of hydrogen (7.4 wt %). If a balance of systems weight of 30 kg is assumed the practical hydrogen storage fraction is 5.7 wt %, exceeding the DOE goal referred to above. Other borohydrides are applicable to this scheme such as those of potassium and lithium but they are less soluble in water and costlier than sodium borohydride.

The prior art discloses that the hydrolysis product sodium metaborate be retained on board, collected and recycled back to sodium borohydride fuel.

This is an attractive concept because sodium metaborate is a relatively mild product, closely related to the common material borax, used in the chemical and detergent industries on a vast scale. Recycling in bulk could thus be done in principle quite cheaply as part of the established borax industry.

Unfortunately there are some performance impacting limitations to the prior art approach. Although the reactant sodium borohydride is appreciably soluble in water (35 wt % at room temperature) the reaction product sodium metaborate is much less soluble in water (20 wt % at room temperature) and has a much higher molecular weight than sodium borohydride. From reaction 5 the fuel quantity 100 kg of 35 wt % sodium borohydride solution (containing 35 kg solid sodium borohydride) will provide 66 kg of metaborate requiring 264 kg of water to maintain solubilization at room temperature (330 kg final solution). Even if all this water were available the hydrogen fraction is reduced to only 2.4 wt %. Of course, the product could be provided at a less weighty dilution in partial solid phase form (for example as a slurry of sodium metaborate requiring much less weight and volume), but the prior art does not disclose a specific means of dealing with this. It is probable that a more dilute fuel than 35 wt % borohydride is used, e.g only 25 wt % (obliging a higher fuel weight for a given hydrogen content) and concomitantly a high dilution of product to enable pumpout, and so in fact a hydrogen content of only about 3-4.5 wt % is reached. Furthermore, Equation 5 does not represent the full reaction in practice, since the sodium metaborate product is usually hydrated (for example to the dihydrate NaBO₂.2H₂O) and and can take up vital water from the system water inventory, further lowering the hydrogen storage fraction.

Required are a means for maintaining both low fuel and product solution weight and volume inventories and avoiding massive, uncontrolled crystallizing out of sodium metaborate, which can clog pipes, pumps, and tanks and destroy the feasibility of facile liquid phase transfer of fuel and product, especially at lower temperature ambients. Additionally, a critical outcome of the poorer solubility of sodium metaborate is that at the catalyst surface (where vital solute water is converted to hydrogen according to reaction 5), notwithstanding the higher temperatures and raised solubilities in the reaction chamber due to the heat of the hydrolysis reaction, solid phase borohydride can form and clog the catalyst surface. The prior art does not present a clear strategy for dealing with this.

One problem of using borohydride solutions of the above compositions is that autodecomposition can be excessive at temperatures much above 30-40° C. Due to the warming of the hydrolysis product solution via the catalytic hydrolysis reaction, and the tendency to pack fuel and product solutions in close proximity in order to reduce system total volume (in some cases a common vessel with a flexible diaphragm is used), the fuel may heat up and lose hydrogen. The prior art presents no strategy for reducing the occurrence of this or a way of removing the parasitic hydrogen that can form.

In Israel Specification 159,793 there is described and claimed a system for hydrogen storage and generation from borohydride solution by catalytic hydrolysis from borohydride to metaborate and hydrogen, characterized in that there is provided at least two separate insulated containers for separate storage of borohydride fuel and metaborate reaction product whereby said fuel and reaction product are maintainable at different temperatures. The relevant teachings of this specification are incorporated herein by reference.

As stated Israel patent application 159,793 described strategies for improving the weight % of hydrogen deliverable from hydrogen storage/hydrogen generation systems based on pumpable chemical hydrides such as sodium borohydride solutions, as well as improving the system stability. In the prior art of Amendola (U.S. Pat. No. 6,534,033) borohydride solutions, usually stabilized with alkali, are fed on demand to a catalyst bed, where they decompose to hydrogen that is supplied to a hydrogen consuming fuel cell or engine. The strategies described therein in Israel patent application 159,793 included use of insulated storage containers (to reduce the decomposition rate of borohydride), use of compaction of solid phase precipitating reaction products (to maintain a pumpable slurry), and introduction of product water (recovered from the operating fuel cell) through the catalyst bed itself (thereby avoiding clogging of the catalyst bed with poorly soluble reaction products such as sodium metaborate).

Unsolved problems despite the above disclosure are the still poor releasable hydrogen content of borohydride solutions and the still hazardous nature of large volumes of concentrated borohydride fuel solutions in a vehicle type scenario. Thus, although from the reaction equation for sodium borohydride decomposition, $$NaBH_4 + 2H_2O = NaBO_2 + 4H_2 \qquad \text{Equation 6}$$

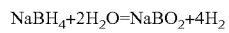

1 kg hydrogen is available from 4.8 kg solid phase sodium borohydride (an impressive 21 wt %), but use of a solution phase to supply the borohydride inevitably lowers greatly the releasable hydrogen content. In fact 20-30 wt % aqueous solution (with about 3-5 wt % sodium hydroxide stabilizer) is commonly used as "fuel" in these systems (so as to avoid concentrations with a high self discharge rate and to avoid freezing in adverse ambients—note the saturation concentration of sodium borohydride at 20 degrees C. is about 35 wt %): all this lowers the releasable hydrogen to 5-7 wt %. The 1 kg of hydrogen is supplied now from 14-20 kg fuel. In addition, if the balance of systems is taken into account (containers, plumbing, pumps catalyst bed, gas/liquid separator etc. needed to deliver the hydrogen) this can amount to an added third of the weight of the fuel, so releasable hydrogen drops below 5 wt %, well below the DOE goal for 2005 for hydrogen storage (about 5 wt % of the storage system weight). Note also large volumes of concentrated borohydride solutions provide a hazard and steady self discharge.

With this state of the art in mind, there is now provided, according to the present invention a solid phase hydrogen-generating system utilizing a solid chemical hydride fuel selected from the group consisting of sodium borohydride, lithium borohydride, magnesium hydride and calcium hydride, wherein said fuel is encapsulated in a plurality of removable capsules, said capsules being pumpable and having a major axis of up to 40 mm.

In preferred embodiments of the present invention said solid hydride is in a form selected from a powder, a granule and a pressed particle.

In preferred embodiments of the present invention said capsules are designed to be opened to discharge said hydride into an aqueous solution for forwarding to a catalyst bed.

In other preferred embodiments of the present invention said capsule is formed as a thin coating surrounding said hydrogen-generating hydride which said coating is removed and the contents delivered into water or an aqueous solution for dissolution and forwarding to a catalyst bed.

In both types of embodiments said capsule can be designed to be pulverized to release said hydride after which the capsule or its fragments can be recovered and re-used if desired.

In especially preferred embodiments said solid hydrogen-generating hydride is combined with a mild stabilizer or binder, preferably selected from the group consisting of sodium carbonate, sodium aluminate and sodium silicate although conventional high alkalinity stabilizers such as sodium hydroxide or potassium hydroxide may of course be included.

Thus according to the present invention there is now provided a system designed to increase safety and the wt % utilizable hydrogen in chemical hydride systems by providing the fuel as a pumpable slurry in capsule or encapsulated form. As well as application to water-soluble borohydrides such as sodium borohydride, this approach is also applicable to certain formulations of the water insoluble hydrides magnesium hydride and calcium hydride as described hereinafter. The fuel is in solid phase form within the capsules or encapsulant, which encapsulant can be selected from polymers such as rigid or flexible plastics, metals, elastomers, water soluble plastics, resins, waxes, oxides such as silica, or gels.

As stated the fuel can be combined with a mild stabilizer or binding agent added to slow self discharge and tendency to dust as opposed to the strongly alkaline stabilizers required in aqueous systems utilizing such hydride fuels since the system of the present invention provides the fuel in solid phase form and the period during which stabilization is required is relatively short and takes place only after the fuel is combined with the aqueous phase for forwarding to the catalyst bed. This does not exclude use of conventional strong alkaline stabilizer in the fuel however.

The fuel, which can have spherical, hemispherical, egg, cylindrical; pill shaped or any convenient pumpable shape, can be supplied dry, i.e. with no accompanying liquid phase, or immersed in or floating on an accompanying liquid phase. If a liquid is supplied with the capsules or encapsulated fuel, this carrier fluid, which may be aqueous or non aqueous, is advantageously selected from the viewpoint of non flammability or low flammability, low reactivity with the fuel, and low freezing point. Suitable candidates for the accompanying carrier fluid are low freezing point aqueous salt solutions, such as carbonates, silicates and formates, and non-aqueous liquids such as glycols, mineral oils, heat transfer fluids and silicones. Fuel capsules or encapsulated fuel may also be supplied in a carrier gas phase such as nitrogen, argon, dry air or carbon dioxide free air. Untreated air is of course also a possibility but it is preferable that at least humidity is kept low. This allows a fairly mild, safe, low combustible and easily maintained fuel option.

As stated the fuel granules may be encapsulated in a coating process by an easily removable thin coating which provides protection against moisture ingress and fuel dust formation The capsule parts and encapsulant are advantageously recyclable or reusable for future use with solid phase fuel.

In especially preferred embodiments of the present invention water generated from a fuel cell reaction, based on hydrogen produced in the system is fed to a catalytic bed used for effecting said catalytic hydrolysis, said water serving to clean said catalyst bed, to prevent clogging thereof by reaction product slurry and to enable the utilization of high concentration fuel solutions. This embodiment in particular allows formation of a slurry product of metaborate within the vicinity of the catalyst bed and relaxes the need for a fully dissolved solution phase, thereby greatly reducing the amount of water required for system operation.

As will be realized the system of the present invention is different than that described in the prior art of Checketts (U.S. Pat. No. 5,817,157 and U.S. Pat. No. 5,728,464) in which pellets of fuel coated with one piece of plastic or dissolvable metal are cut open or electrolytically dissolved in order to access the contents. In Checketts the coating must totally protect for long storage periods against any water ingress at all since water would react explosively with the alkaline metal hydride inside, and hence the plastic coating is very thick and impervious and in the order of 1 mm to protect a 40 mm diameter pellet. In the present invention only a short term protection is needed to resist accidental water exposure of fuel and prevent granule breakup and dust formation in transit. The encapsulant can be thin, e.g. a few hundred microns in thickness, and the fuel elements are smaller and are preferably in the range of about 1-30 mm. If water does penetrate, only a mild reaction of dissolution or self discharge occurs in the present system.

Furthermore the hydrolysis products of the present invention, such as sodium metaborate from sodium borohydride, and magnesium hydroxide from magnesium hydride are much milder than the alkaline metal hydroxide products e.g. sodium hydroxide from sodium hydride of Checketts.

In US patent application, U.S. 2004/0009379, there is described and claimed a method and apparatus for processing discharged fuel solution from a hydrogen generator, however, said system involves and requires an element for receiving discharged fuel solution and removing substantial amounts of the liquid therein, and does not teach or suggest a system wherein there is produced a discharge product which is in slurry form and not in solution form. Furthermore, said application does not teach or suggest utilization of a solid chemical hydride fuel which is encapsulated in a plurality of removable capsules, wherein said capsules are pumpable and have a major axis of up to 40 mm.

In US patent application U.S. 2004/0047801, there is described and claimed a method and system for generating hydrogen for dispensing solid and liquid fuel components, however said patent application teaches and requires a first and a second dispenser for respectively providing predetermined amounts of a solid fuel component and a liquid fuel component to a reaction chamber for producing hydrogen while the present invention provides a preformed borohydride solution for introduction into the catalytic chamber for catalytic hydrolysis thereby obviating the potential problem of solid borohydride being introduced into the catalytic chamber and failing to react.

Similarly U.S. Pat. No. 5,372,617 teaches and describes hydrogen generation by hydrolysis of hydrides for undersea fuel cell energy systems by a hydrolysis reaction between water and a hydride, wherein said generator comprises a vessel having a chamber containing a hydride and water input ports in communication with a water source disposed at spaced intervals within said chamber for introducing water into said chamber for reaction with the hydride and generation of hydrogen gas, however, said patent does not teach or suggest utilization of a solid chemical hydride fuel which is encapsulated in a plurality of removable capsules, wherein said capsules are pumpable and have a major axis of up to 40 mm.

In one embodiment of the present invention the fuel is encapsulated in a thin mechanically removable or pulverizable encapsulant. The fuel capsule or encapsulated fuel normally protects the contents from water access and mechanical disintegration, such as dust formation, for the required period. When contents are to be accessed capsules are opened by mechanical or pressure means in a suitable on-board capsule selection, feeding and opening device, and the contents washed into a dissolving chamber or a reaction chamber. The opened capsule sections themselves can be retained in the system for later collection with the reacted fuel product as parf of the fuel recycling process. Alternatively, encapsulated fuel is accessed by crushing, puncturing, maceration or dissolving means. Dissolution of encapsulant for example can be preferably achieved spontaneously by temperature, chemical or pH initiation or similar means in the reaction chamber.

In the case of a dissolving chamber a fuel solution is prepared for later flowing over a catalyst bed for hydrogen generation in the case for water soluble, non-spontaneously reacting chemical hydrides such as sodium borohydride and lithium borohydride. In the case of a reaction chamber the fuel reacts spontaneously with water to generate hydrogen in the case with mild reacting chemical hydrides such as special formulations of magnesium hydride and calcium hydride which are insoluble in water but which immediately react with it to give the mild product magnesium hydroxide and similarly for calcium hydride to give calcium hydroxide. The reaction for magnesium hydride is:

$$MgH_2 + 2H_2O = Mg(OH)_2 + 2H_2 \qquad \text{Equation 7}$$

In a separate embodiment for soluble chemical hydrides, the capsule may preferably be expandable, e.g., via a sliding, flexible or bellows section, and fitted optionally with a valve. Thus the capsule can be in two sections as before to enable opening and original filling with solid phase fuel. For capsule activation, there can be injected a predetermined quantity of water through the capsule wall or through the valve into the capsule, at an early stage in the capsule handling program.

The capsule passes on, allowing its contents to meanwhile fully dissolve and later the capsule is mechanically opened or compressed to release its contents.

A key reason for weight saving in the present invention is that water for dissolution/reaction of the solid phase fuel does not have to be carried on board in the fuel but can be provided from reclaimed water product from the fuel cell (or engine combustion) reaction.

$$2H_2 + O_2 = 2H_2O \qquad \text{Equation 8}$$

Thus in Equation 6, although two moles of water is required to react with one mole of solid borohydride, four moles of water are in principle reclaimable from the fuel cell reaction, which is enough to both dissolve the borohydride and for the catalytic hydrolysis reaction itself. Similarly, in Equation 7, although two moles of water is required to react with one mole of solid magnesium hydride, two moles of water are in principle reclaimable from the fuel cell reaction, which is enough for the spontaneous hydrolysis reaction itself.

Having provided a solid phase hydrogen-generating system as defined hereinabove which utilizes a solid chemical hydride fuel encapsulated in a plurality of removable capsules, it is possible to design an improved system for hydrogen storage and generation which obviates many of the problems of the prior art systems.

Thus according to the present invention there is now also provided a system for hydrogen storage and generation from borohydride solution by catalytic hydrolysis from borohydride to metaborate and hydrogen, characterized in that there is provided at least two separate insulated containers for separate storage of borohydride fuel and metaborate reaction product whereby said fuel and reaction product are maintainable at different temperatures.

In preferred embodiments of the present invention, said system comprises separate heating and cooling means for said at least two separate insulated containers.

In especially preferred embodiments of the present invention, each of said containers is provided with agitation means for maintaining said reaction product as a pumpable slurry.

In other preferred embodiments of the present invention, each of said containers is provided with compaction means for forming said reaction product into pumpable pellets of predetermined size.

Preferably, water generated from a fuel cell reaction, based on hydrogen produced in the system is fed to a catalytic bed used for effecting said catalytic hydrolysis, said water serving to clean said catalyst bed, to prevent clogging thereof and to enable the utilization of high concentration fuel solutions, whereby the discharged product can be and preferably is in slurry, since said water will act to clean the catalyst bed without the need for the utilization of sufficient water to convert said discharge product slurry to solution, obviating the water balance and water inventory problems of prior art systems.

In a further embodiment the metaborate slurry product is subjected to heat available on-board, selected from the hydrolysis reaction, from the fuel cell heat exchange system or from the hydrogen engine exhaust, in order to at least partly dehydrate the metaborate hydrate. For the hydrolysis reaction and certain fuel cell systems a temperature range of 80-120 degrees C. is available enabling dehydration to the monohydrate, whilst for hydrogen engines higher temperatures are available from 200-350 degrees C. resulting in dehydration to anhydrous metaborate. The water released is reclaimed by suitable means (such as a condenser) and reused by the hydrolysis system.

Thus in a first preferred embodiment of the present invention said metaborate hydrate hydrolysis product is at least partially dehydrated utilizing heat from the hydrolysis process.

In a second preferred embodiment of the present invention, said metaborate hydrate hydrolysis product is at least partially dehydrated utilizing waste heat of a fuel cell.

In a third preferred embodiment of the present invention said metaborate hydrate hydrolysis product is at least partially dehydrated utilizing waste heat of a hydrogen engine.

In especially preferred embodiments, metaborate product is electrochemically regenerated into borohydride in an electrochemical synthesis cell, wherein the anode of said cell is a hydrogen consumption electrode.

In further preferred embodiments of the present invention, said container for storage of borohydride fuel is provided with at least one catalytic hydrogen recombination valve.

The invention will now be described in connection with certain preferred embodiments with reference to the following illustrative figures so that it may be more fully understood.

While the invention will now be described in connection with certain preferred embodiments in the following examples so that aspects thereof may be more fully understood and appreciated, it is not intended to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

EXAMPLE 1

A system is designed for hydrogen storage and generation using sodium borohydride fuel to enable production of 10 kg hydrogen, enough for a 400 km range between refueling for a fuel cell powered passenger van. It was found that in order to enable adequate vehicle acceleration only about 90% of the fuel reacts to give hydrogen, so there was introduced onboard a total inventory of 53 kg sodium borohydride (i.e 10% excess over the hydrolysis reaction stoichiometry). This fuel (including 1 kg sodium carbonate stabilizer and 1 kg sodium silicate binder) is compressed into 10 mm diameter spheres and encapsulated in thin walled (200 micron) flexible polyethylene snap fit capsules that are mechanically opened when the fuel is to be dissolved in water. The weight of the polyethylene capsules is 6 kg, giving a fuel weight of 61 kg of filled capsules, with the specific gravity of capsules about 1. The fuel volume is 75 liters. The capsules are pumped pneumatically into the vehicle using dry air which is used also to store the fuel capsules. The system was fitted with catalytic recombination valves for safe removal of parasitic hydrogen whereby such hydrogen is passively combined with oxygen in the air to give water vapor. To the pumpable fuel capsules weighing 61 kg there was added a further 50 wt % for balance of systems, ballast fuel solution and initial reaction water, producing a final system weight of only 92 kg. This is equivalent to a hydrogen storage level of 10.8 wt %, over double the near term DOE goal of 5 wt %. During system operation fuel capsules are fed in, opened and the contents dissolved in water as required. Solution phase fuel (maintained in an insulated storage tank) is pumped over the system catalyst bed to generate hydrogen which is fed to the fuel cell without the need for the introduction of excess water sufficient to dissolve all of the metaborate discharge product into solution since the product slurry which is formed and can clog the catalyst bed is removed by injection of product water via the catalyst bed. By means of a condenser sub system working with the gas stream exits of the fuel cell it is possible to recover 90% of water formed from the fuel cell reaction. From 10 kg hydrogen 81 kg of water is accordingly recoverable. This water is heatable from either the waste heat from the system hydrolysis reaction or from the fuel cell reaction, which is enough to dissolve all the sodium borohydride in the capsules. Following the reaction to release hydrogen there has been generated about 92 kg of sodium metaborate. This metaborate product is dealt with, as it precipitates out in the limited water available, by periodic compression of settling-out precipitate into dense pellets of 3-4 mm diameter which are readily pumpable out from the system. The specific gravity of the pellets is about 2.5, so the volume of the product metaborate is similar to the original borohydride fuel volume.

Two further points should be mentioned. The size of capsules is preferably a tradeoff between smaller diameter capsules, ensuring a more easily pumpable slurry without demanding too large diameter hosing or too specialized pumps but many capsules, and between larger diameter capsules whereby less capsules have to be processed per unit time, less fuel capsules per vehicle but more fuel has to be dissolved/reacted each time. The optimum capsule diameter lies between −1-30 mm. Secondly, since water in the system is limited, use is preferably made of the means and systems described hereinafter, in order to keep the reaction products manageable and pumpable. In particular are important the need for periodic compaction of precipitating reaction products into dense balls of a few mm diameter, as well as the need for injection of product water via the catalyst bed itself in the case of the catalyzed hydrolysis of borohydride in order to prevent the less soluble metaborate reaction product clogging the catalyst bed, and insulation, especially of borohydride containing tanks, to reduce self discharge.

Figure 1:
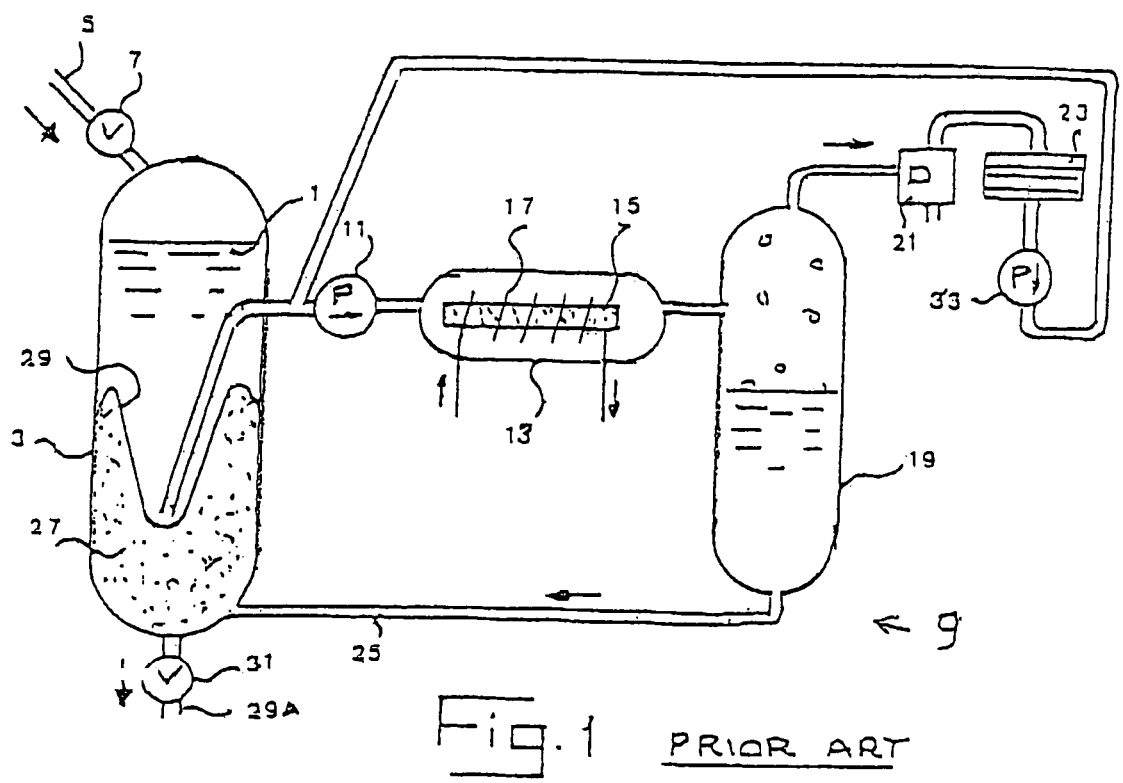
FIG. 1 is a schematic representation of hydrogen generation systems according to the prior art.

Referring now to the drawings in detail the general principle of prior art hydrogen generation systems (including application for vehicle systems) based on a fuel of aqueous sodium borohydride solution is shown in FIG. 1. The fuel 1 is stored in a storage tank 3, connected with a reaction loop 9 and at rest does not normally produce hydrogen. When hydrogen is required, fuel pump 11 introduces the fuel at a controlled rate into a reaction chamber 13 where the fuel contacts a catalyst bed 15. Cooling means for the reaction chamber contents is provided via a heat exchanger (only the cooling coil 17 of the heat exchanger is shown). Hydrogen catalytically generated in the reaction chamber 13 flows together with reacted fuel (sodium metaborate) to a gas/liquid separator 19, and gas emerging from the upper part of the gas/liquid separator is fed via a dehumidifier 21 to a fuel cell stack 23, thus providing electricity to power the vehicle electric motor. Hydrogen could similarly be supplied to a hydrogen combusting engine. Spent fuel (sodium metaborate) exits from the base of the gas/liquid separator 19 via the pipe 25 and is stored on board to await collection for regeneration back to borohydride. In FIG. 1 the metaborate is shown stored in the same storage tank 3 used for the borohydride fuel (in the lower section of the tank 3). A flexible diaphragm or bladder 29 separates the two storage volumes of borohydride fuel 1 and metaborate 27. Use of a single tank for both fuel and metaborate allows for a more compact system. The storage tank 2 is fitted with an entry port 5 and valve 7 for introducing borohydride and an exit port 29A and valve 31 for removing metaborate. Water recovered from the fuel cell can be added to a water storage tank (not shown) and is fed back via pump 33 to reenter the loop just before pump 11, enabling optional dilution of the fuel solution before it enters the catalyst bed.

Figure 2:
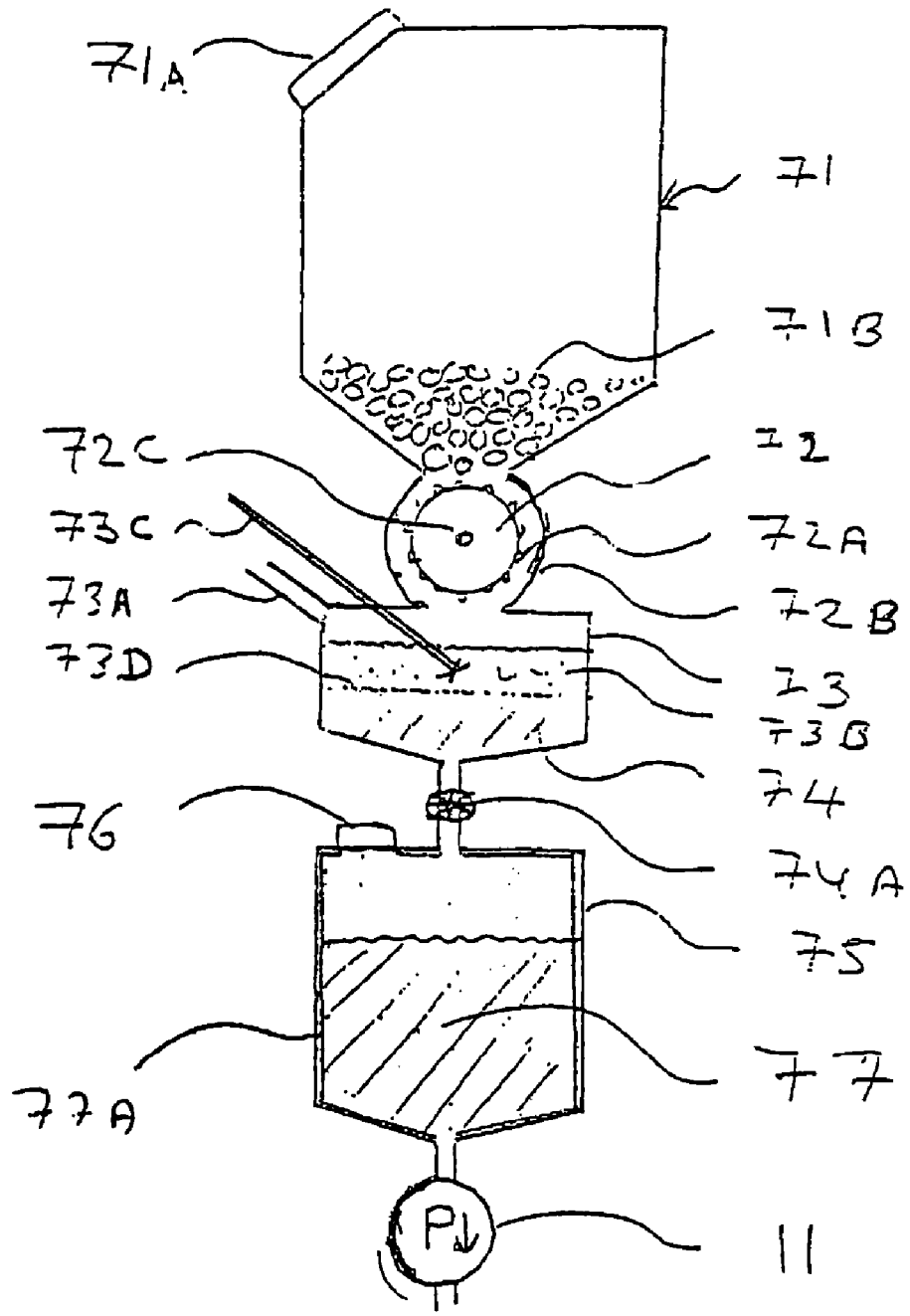
FIG. 2 is a cross sectional view of a hydrogen generation system that enables use of a solid phase fuel according to the present invention.
Figure 2A:
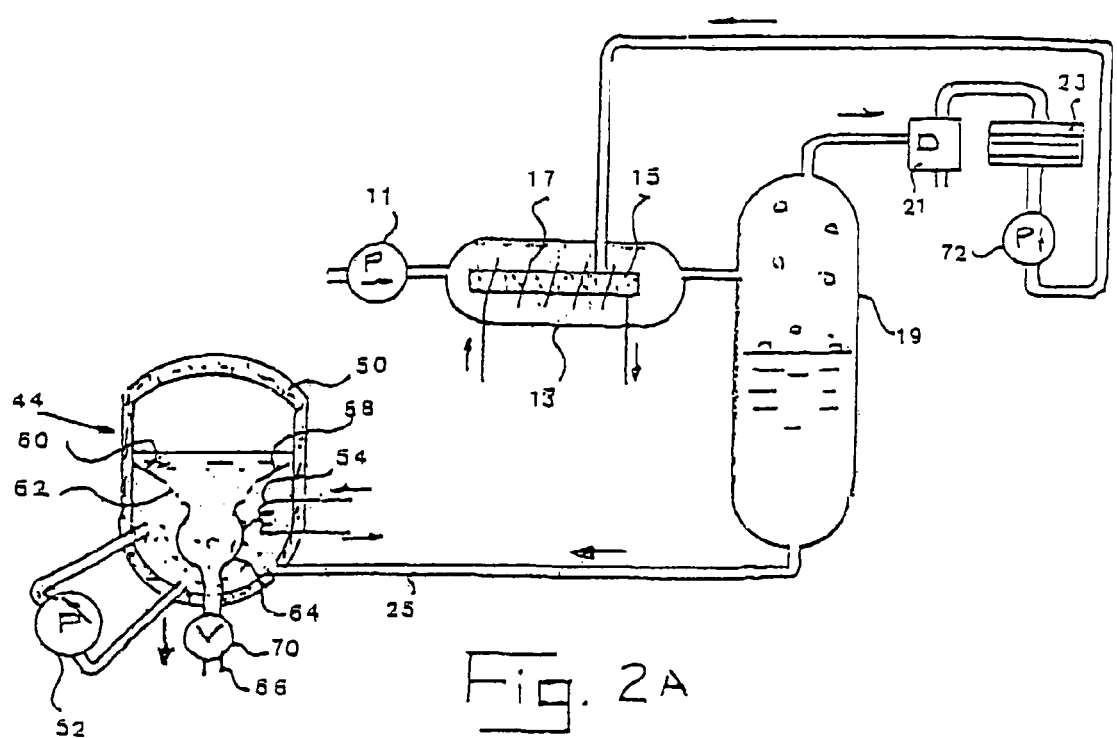
FIG. 2A is a schematic representation of a hydrogen generation system according to the present invention.

FIG. 2a shows how in the present invention a solid phase fuel may be used, for example a water soluble hydride such as sodium borohydride. The solid phase fuel 71B, which comprises in this case spherical granules of sodium borohydride covered by a protective hot water-soluble polymer coating, is pumped by pneumatic means into the fuel tank 71 via the closure 71A which is advantageously fitted with a hydrogen recombination valve and drying agent (not shown). Fuel is pulverized in a mechanical crusher, shown here as comprising a cylinder 72 fitted with teeth 72A that is mounted on an axis 72C turned by a motor (not shown). Rotation of the cylinder causes fuel to be drawn into the crusher where it is pulverized between the teeth 72A and the crusher housing 72B, such that fuel powder drops down into the dissolving vessel 73. Fuel powder is dissolved in water supplied via pipe 73A from a water tank (not shown) which is continually replenished with fuel cell condensate. Powder dissolution is aided by a stirrer 73C. Vessel 73 is fitted with a porous partition 73D that allows only dissolved fuel 74 to reach the lower part of the vessel. Dissolved fuel is fed via valve 74A to the fuel ballast tank 75 which is advantageously well insulated (77A) to reduce self discharge and/or freezing. Fuel ballast tank 75 is fitted with a hydrogen recombination valve 76 and is advantageously fitted with agitation means and heating means (not shown). These agitation and heating operations are required periodically and may require a small consumption of the hydrogen inventory onboard. Note that the ballast tank 75 can be much smaller that the fuel tank 1 of FIG. 2 (in which all the fuel must be stored as dissolved phase). Fuel solution 77 is then passed via pump 11 to the catalyst bed as previously in FIG. 1 and the system operates as before. Note that water from the fuel cell reaction may be used partly to dissolve freshly crushed fuel and partly to keep the catalyst bed unplugged (see below).

Further proposed invention improvements are shown in FIG. 2A, wherein the same reference numbers are used for the same elements as in FIG. 1. Note that in FIG. 2A only the elements following the pump 11 of FIG. 1 and FIG. 2 have been included.

In order to maintain a relatively high temperature of metaborate solution and reduce crystallization/freezing out as much as possible under adverse conditions, and to minimize heating of adjacent fuel volumes, the metaborate storage tank 44 is preferably insulated using an insulation layer 50 which insulates a large fraction of the area of the tank. The metaborate tank 44 is also provided with agitation means 52, shown as a pump, although it is possible to alternatively use stirrer or diaphragm oscillation means (not shown) and is fitted with heating/cooling means indicated by the heat transfer coil 54. Electric heating or thermoelectric cooling can alternatively be used. Cooling, or passive maintaining of cold, is advantageous at high ambients or when the metaborate temperature is high, in order to reduce heat transfer to the fuel ballast tank (element 75 in FIG. 2), whereas heating, or passive maintaining of heat, is desirable under very cold conditions to avoid crystallizing out/freezing of metaborate and adverse viscosities, while agitation helps delay freezing out and provides faster homogeneity. These heating, cooling and agitation systems may need only to operate periodically and the energy to power them will come from the fuel cell at some sacrifice of the hydrogen inventory on board.

Figure 3:
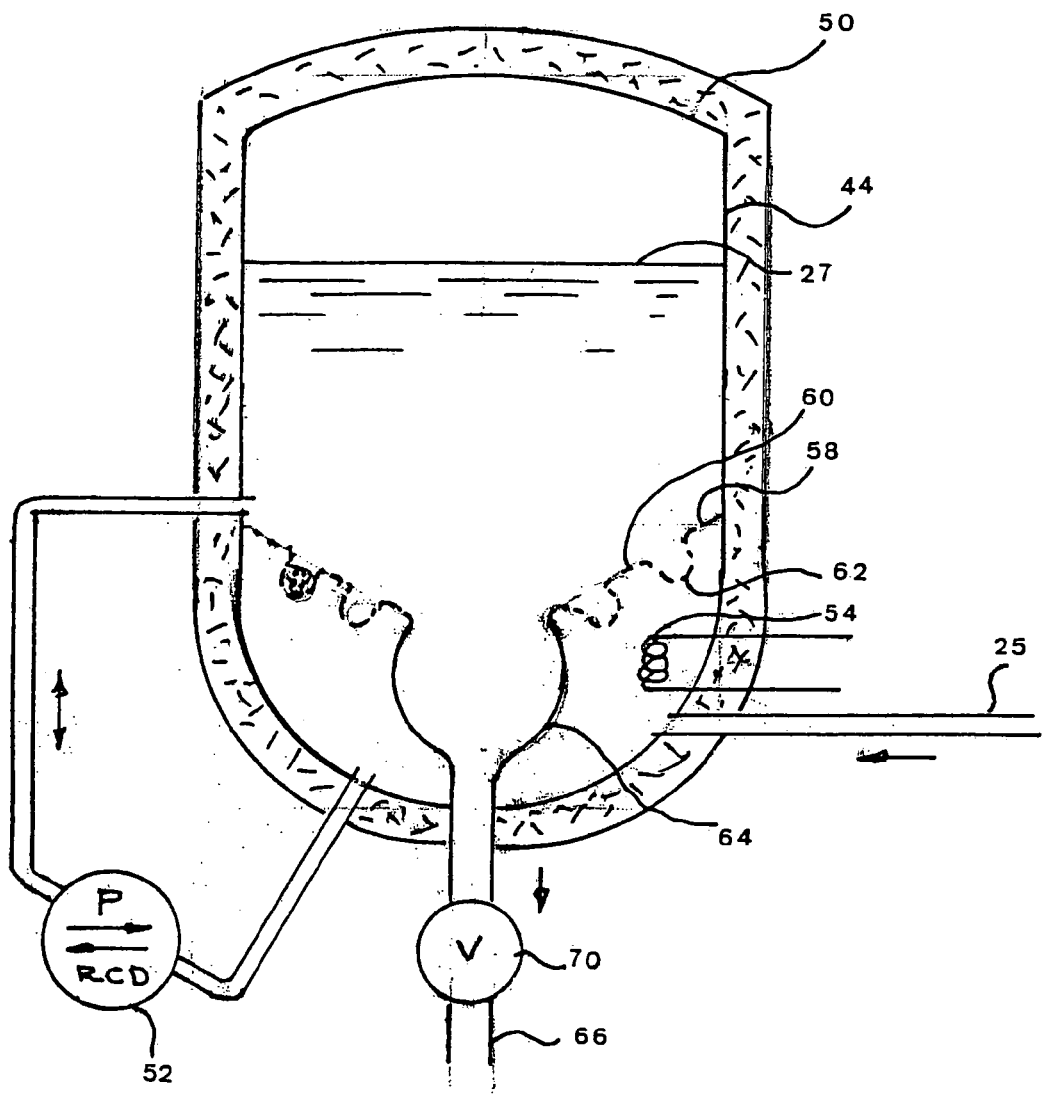
FIG. 3 is a cross-sectional view of a pelletizing means for use in the present invention.

An additional device situated in the metaborate tank 44 of FIG. 2A in order to deal with poorly soluble metaborate is pelletizing means (FIG. 3). Crystallites settling out of solution under adverse conditions of oversaturation or low temperature are compacted mechanically to give small dense pellets of a few millimeters diameter thereby maintaining a manageable pumpable slurry phase in the metaborate tank and avoiding massive crystallite formation. FIG. 2A shows one means for pump-actuated precipitate compaction but other means can be used (e.g. mechanical compaction/ejection of precipitate in the jaws of a press). For compaction a funnel 58 extends across the lower section of the storage tank 44. Funnel 58 has open meshed or porous upper walls 60, with recessed mesh-walled or porous-walled sockets 62, and a lower bell shaped (solid walled) section 64 extending to the bottom of the tank. The sockets 62 are hemispherical in shape with a diameter of a few millimeters but other geometries for the sockets (e.g. cylindrical, hexagonal etc.) may be used. Any crystallites settling out, with the help of the pump 52, which provides agitation and general downwards movement and circulation of the tank contents, will tend to pack solid metaborate into the sockets. Periodically, when the pump 52 senses an excessive pressure drop, the pump flow direction is automatically reversed so backflow dislodges the compacted pellets from the sockets, and the expelled pellets settle down as a manageable slurry (with particles of a few millimeter diameter) into the base section 64 of the funnel. When the pump 52 senses its usual pressure range once again, the original downwards flow direction of the tank contents is resumed. Emptying of the metaborate tank 44 during vehicle refueling is easily done by liquid phase or slurry pumping means via the valve 70 and exit port 66.

An additional aspect of the invention is provided to better avoid clogging of the reaction chamber catalyst with solid phase sodium metaborate slurry and enables the use of higher concentrations of fuel and metaborate. In FIG. 2A water recovered from the fuel cell stack is at least in part fed (via pump 72) into the reaction chamber via the porous catalyst bed itself. Thus clogging of the catalyst bed is avoided at its most sensitive part.

Figure 4:
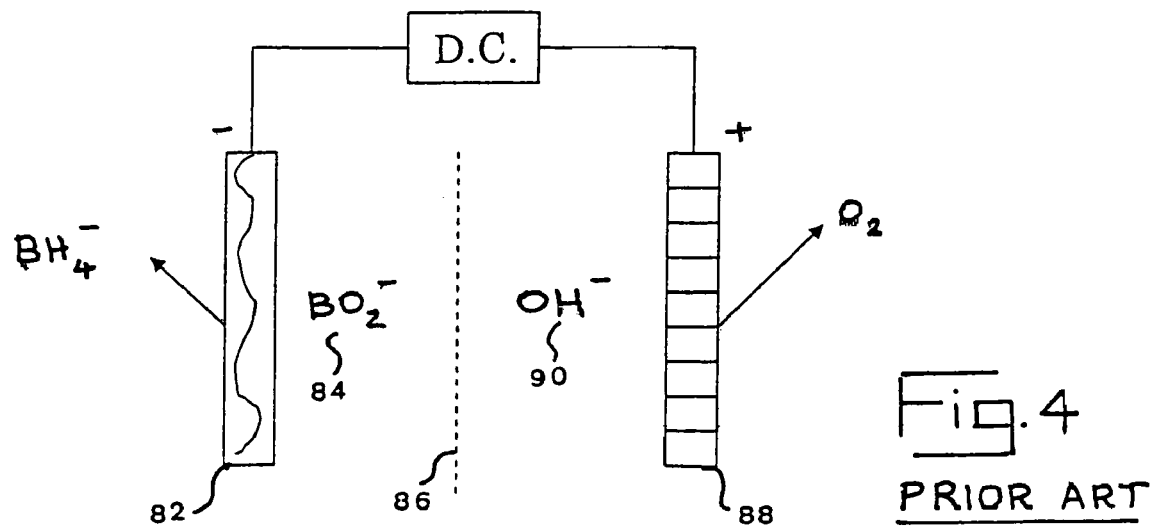
FIG. 4 is a schematic representation of a prior art electrosynthesis cell.

The final aspect of the invention is directed to regeneration of borohydride from metaborate in an aqueous electrosynthesis cell. Prior art shown in FIG. 4 discloses an electrosynthesis cell with a cathode 82 in contact with a borohydride forming phase 84 (e.g. sodium metaborate solution), an ion selective diaphragm 86 preventing free transfer of borohydride to the anode, and an anode 88 in contact with an oxygen precursor phase 90 (e.g. sodium hydroxide solution). External DC voltage is supplied to the cell (or plurality of cells). The desired cell reaction is:

$$BO_2^- + 2H_2O = BH_4^- + 2O_2 \qquad \text{Equation 9}$$

The cathode is of a material with a high overvoltage for hydrogen evolution, enhancing borohydride formation (and avoiding parasitic hydrogen generation), while the anode is of a material with a low overvoltage for oxygen evolution enabling oxygen evolution at minimal overvoltage. The inevitably high overvoltage at oxygen evolution anodes however, even at so called "low overvoltage" oxygen evolution anodes, results in a high operating cell potential in excess of 2V at practical current densities (the theoretical potential for the cell reaction is 1.65V). This voltage loss lowers efficiency of the regeneration process and wastes energy. Moreover the presence of an oxygen evolving anode in the cell tends to reduce yield of borohydride, since freshly formed material is sensitive to parasitic oxidation.

Figure 5:
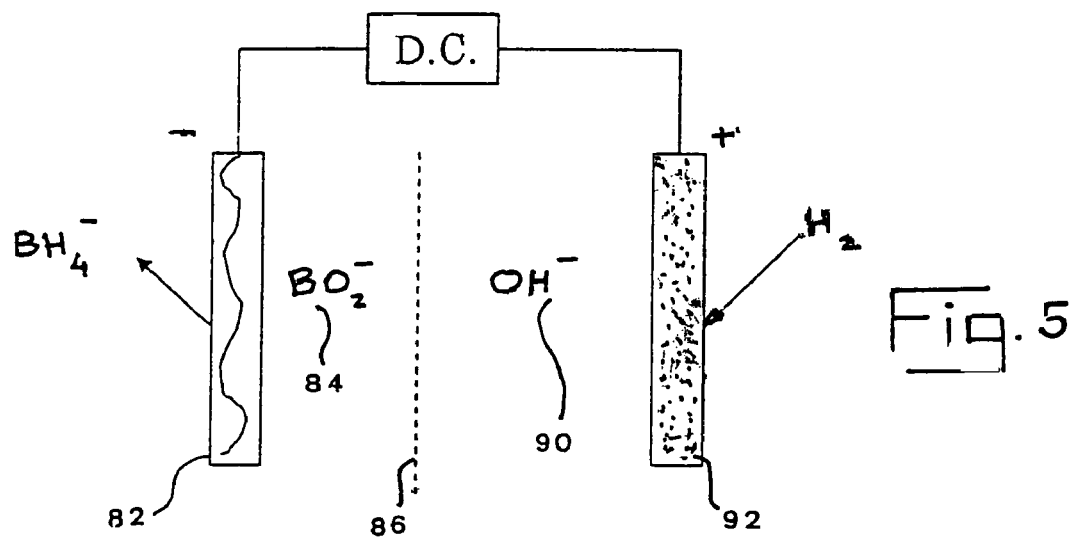
FIG. 5 is a schematic representation of an electrosynthesis cell according to the present invention.

In the present invention the problematic oxygen evolving anode in the electrosynthesis cell is replaced by a hydrogen consuming anode 92 (FIG. 5).

Hydrogen is fed to this anode and a much lower DC potential is applied to the cell than before, giving for the synthesis reaction:

$$BO_2^- + 4H_2 = BH_4^- + 2H_2O \qquad \text{Equation 10}$$

The theoretical potential for reaction 7 is only 0.41V, but since both electrodes can operate quite reversibly, the working potential is quite close to this figure at practical current densities. High energy efficiencies are thus maintained. Moreover, there is much less chance of parasitic oxidation of borohydride in the cell at the reduced potential and in the absence of the troublesome oxygen evolving anode. Hydrogen for the process is suppliable from a variety of sources (e.g. reforming of natural gas or other fuels, electrolysis powered by solar energy, biosynthesis etc.), while high performance durable hydrogen consuming anodes are known from fuel cells (e.g. gas diffusion types). Although the reaction is described using a hydrogen consuming anode for aqueous solution, similar schemes are possible for other systems involving the equivalent metaborate and borohydride ions, for example in organic solvents.

EXAMPLE 2

Figure 6:
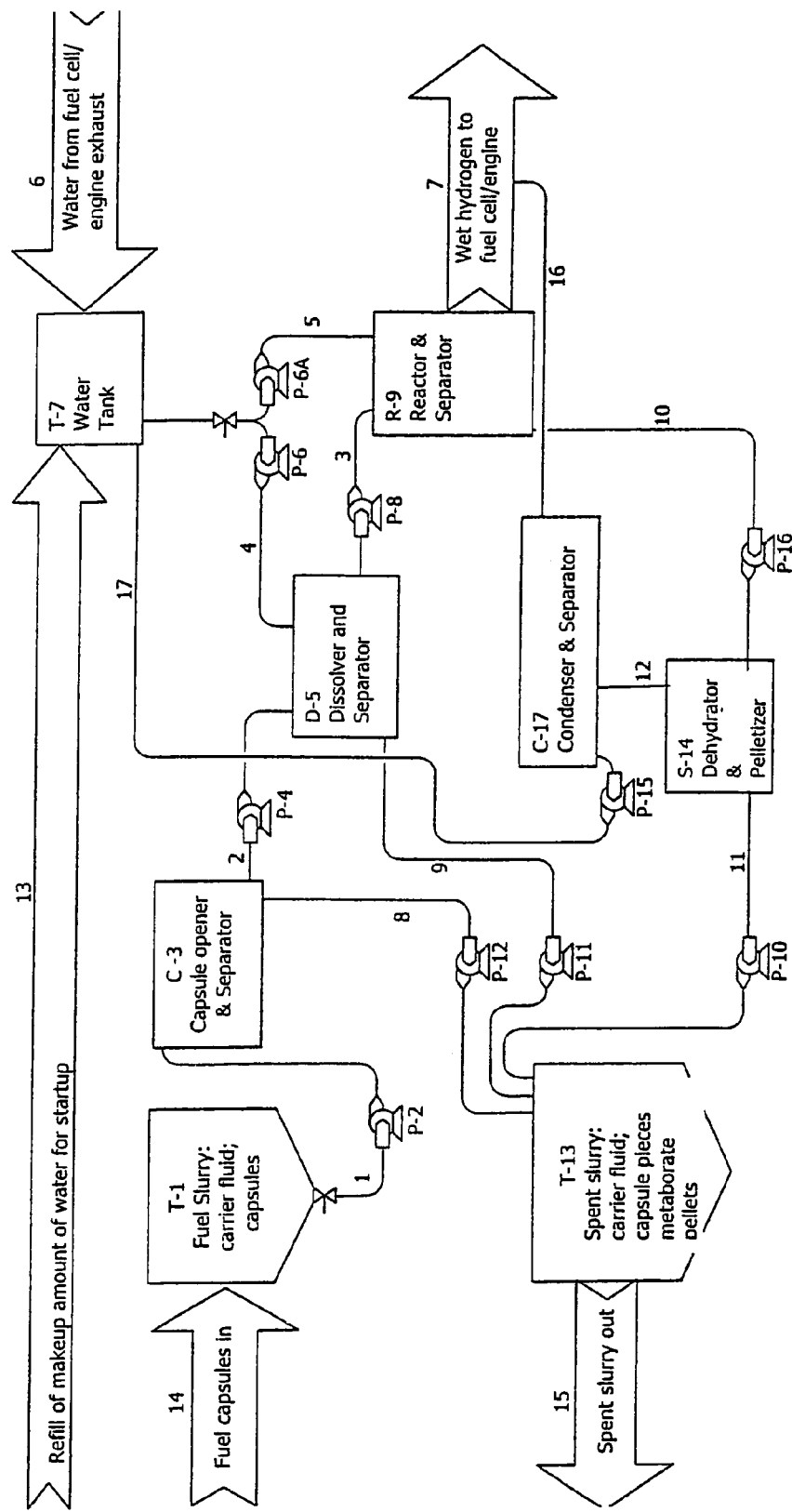
FIG. 6 is a schematic representation of a hydrogen generation system for use on board a vehicle according to the present invention.

Referring now to FIG. 6, the block diagram illustrates the operation of a hydrogen generation system located on board a vehicle according to the present invention. All pumps (symbol P) shown in the diagram are the means of moving material between units. T1 is the vehicle's fuel tank, containing a slurry of encapsulated sodium borohydride (SBH) granules in a carrier fluid such as oil. Similar schemes are appropriate for other complex hydrides. The tank is refueled in a refueling station (item 14) by pumping. C-3 is a unit that opens up or crushes the SBH granules. The oil and the encapsulation material are separated and sent via line 8 to T13, while the solid SBH goes via line 2 to D-5. D-5 is a dissolution system wherein solid SBH that comes in via line 2 is dissolved in water that flows in from T-7 via line 4 (and can be stored temporarily in a buffer tank, not shown, if required). SBH solution is fed via line 3 to R-9. R-9 is the reactor unit with a catalyst bed where hydrogen is generated by catalytic hydrolysis. SBH reacts there with the water to create hydrogen and sodium metaborate (NaBO$_2$ hydrate) slurry. Additional water stream coming from line 5, advantageously injected into R-9 via the catalyst bed, washes the metaborate slurry out of the R-9 via line 10. The hydrogen is separated and sent to the fuel cell or engine power unit via line 7. Hydrogen is consumed in the fuel cell or engine to produce energy and water. Part of the created water is recovered and fed via line 6 to the water tank T-7. S-14 is a unit that dehydrates metaborate hydrate using heat of hydrolysis fuel cell waste heat or engine waste heat, releasing water for condensation and reuse. The water is released by heating between 80 degrees C. and 120 degrees C. for fuel cell powered systems (in which case the dehydration product is sodium metaborate monohydrate) and between 200 degrees C. and 350 degrees C. in the case of a hydrogen engine (in which case the dehydration product is anhydrous sodium metaborate), using external heat from the fuel cell or engine respectively. Anhydrous metaborate is preferable for various recycling schemes back to borohydride. At these temperatures, if possible in some cases also under reduced pressure conditions, the hydrated metaborate created at R-9 will dehydrate and release water. The gas phase (water vapor and some hydrogen carryover) flow via line 12 to C-17. The resulting metaborate is pelletized at S-14 and removed via line 11 to T-13 where it remains in a pumpable form covered by oil. C-17 condenses the water vapor, which are returned to T-7 via line 17. The hydrogen is separated and flows through line 16 to join the main hydrogen flow in line 7. T-13 is the metaborate, or spent fuel tank. Its contents are removed from the vehicle during refueling via line 15.T-7 is the operational water tank. During refueling, water is added via line 13 if the water level is below a predetermined minimum.

Thus, a hydrogen engine powered vehicle would have a fuel tank into which is pumped a fuel slurry of encapsulated borohydride granules in a mineral oil. This vehicle, for adequate range between refuelings, would require about 10 kg of delivered hydrogen. That would require a slurry fuel comprising about 40 kg of sodium borohydride, and a further 20 kg to include mineral oil carrier, additives to the encapsulated borohydride, and the encapsulation material. By recovering at least half the water product of hydrogen combustion from the engine exhaust, and fully dehydrating the metaborate reaction product at 200 degrees C. using onboard engine heat, an amount of up to 50 kg of onboard water is sufficient for complete borohydride utilization according to the present invention, without requiring excessive onboard water to solubilize and hydrate the metaborate product. If one were to allow 30 kg for balance of systems, the 10 kg of hydrogen is provided therefore by a total storage system weight of 140 kg (60 kg fuel slurry, 50 kg water and 30 kg balance of systems) giving an impressive hydrogen storage fraction of over 7%. During refueling fresh borohydride fuel is pumped in and spent material (pelletized anhydrous metaborate and encapsulation pieces or fragments in oil) is pumped out for sending for recycling back to borohydride.

It is intended that while the invention is primarily intended for use in fuel cell vehicles, the scope includes use in hydrogen vehicle engines and non-vehicle use including stationary and portable systems such as those in which borohydride is used as a hydrogen carrier as well as the application of principles of the present invention for use in the production of borohydride from metaborate.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A solid phase hydrogen-generating system comprising a solid chemical borohydride fuel selected from a group consisting of sodium borohydride and lithium borohydride, said borohydride fuel being adapted to undergo hydrolysis when in solution in contact with a catalyst material, wherein said fuel is encapsulated in a plurality of removable capsules, said capsules having a major axis of up to 40 mm, and wherein said capsules are retained in a carrier having low reactivity with said chemical borohydride fuel, and said capsules and carrier are pumpable, and wherein said capsules are designed to be pulverized to release said hydride into an aqueous solution in dissolved powder form for forwarding to a catalyst bed, and said solid borohydride is combined with a stabilizer or binder, wherein said stabilizer or binder is selected from the group consisting of sodium carbonate, sodium aluminate and sodium silicate.

2. A solid phase hydrogen-generating system according to claim 1 wherein said solid hydride is in a form selected from a powder, a granule and a pressed particle.

3. A solid phase hydrogen-generating system according to claim 1 wherein said capsule is formed as a thin coating surrounding said hydrogen-generating hydride.

4. A solid phase hydrogen-generating system according to claim 1 wherein said carrier comprises a fluid selected from a group consisting of a glycol, a mineral oil, a heat transfer fluid, and a silicone.

5. A solid phase hydrogen-generating system according to claim 1 wherein said carrier comprises an inert gas selected from a group consisting of a nitrogen, argon, dry air and carbon-dioxide-free air.

6. A solid phase hydrogen-generating system according to claim 1 wherein said fuel is sodium borohydride or lithium borohydride and said system is configured to generate a hydrolysis reaction product comprising metaborate, said system further comprising at least two separate insulated containers for separate storage of said fuel and said metaborate reaction product whereby said fuel and reaction product are maintainable at different temperatures in said system.

7. The system according to claim 6, comprising separate heating and cooling means for said at least two separate insulated containers.

8. The system according to claim 6, wherein each of said containers is provided with agitation means for maintaining said reaction product as a pumpable slurry.

9. The system according to claim 6, wherein at least one of said containers is provided with compaction means for forming said reaction product into pumpable pellets of predetermined size.

10. The system according to claim 6, further comprising water generated from a fuel cell reaction; based on hydrogen produced in the system, wherein the water is fed to a catalytic bed used for generating said hydrolysis reaction product, said water serving to clean said catalytic bed, to prevent clogging thereof by said reaction products and to enable utilization of high concentration fuel solutions.

11. The system according to claim 6 further comprising an aqueous electrochemical synthesis cell, wherein said metaborate reaction product is electrochemically regenerated into borohydride in said aqueous electrochemical synthesis cell, and the cell comprises an anode that is a hydrogen consumption electrode.

12. The system according to claim 6 wherein said container for storage of said fuel comprises at least one catalytic hydrogen recombination valve.

13. The system according to claim 6 wherein said system further comprises means for dehydrating said metaborate reaction product.

14. The system according to claim 13 wherein said means for dehydrating said metaborate hydrate hydrolysis product utilizes heat from the hydrolysis process.

15. The system according to claim 6 wherein said said means for dehydrating said metaborate hydrate hydrolysis product utilizes waste heat of a fuel cell.

16. The system according to claim 6 wherein said means for dehydrating said metaborate hydrate hydrolysis product utilizes waste heat of a hydrogen engine.

17. A solid phase hydrogen generating system according to claim 1 wherein said system further includes a catalyst bed.

* * * * *

UNITED STATES PATENT AND TRADEMARK OFFICE
CERTIFICATE OF CORRECTION

PATENT NO.      : 7,594,939 B2                     Page 1 of 1
APPLICATION NO. : 11/210086
DATED           : September 29, 2009
INVENTOR(S)     : Goldstein et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 468 days.

Signed and Sealed this

Twenty-eighth Day of September, 2010

David J. Kappos
*Director of the United States Patent and Trademark Office*